March 27, 1962
C. E. HEMINGWAY
3,027,018
STOCK FEED FOR SCREW MACHINE
Filed May 8, 1957
4 Sheets-Sheet 1
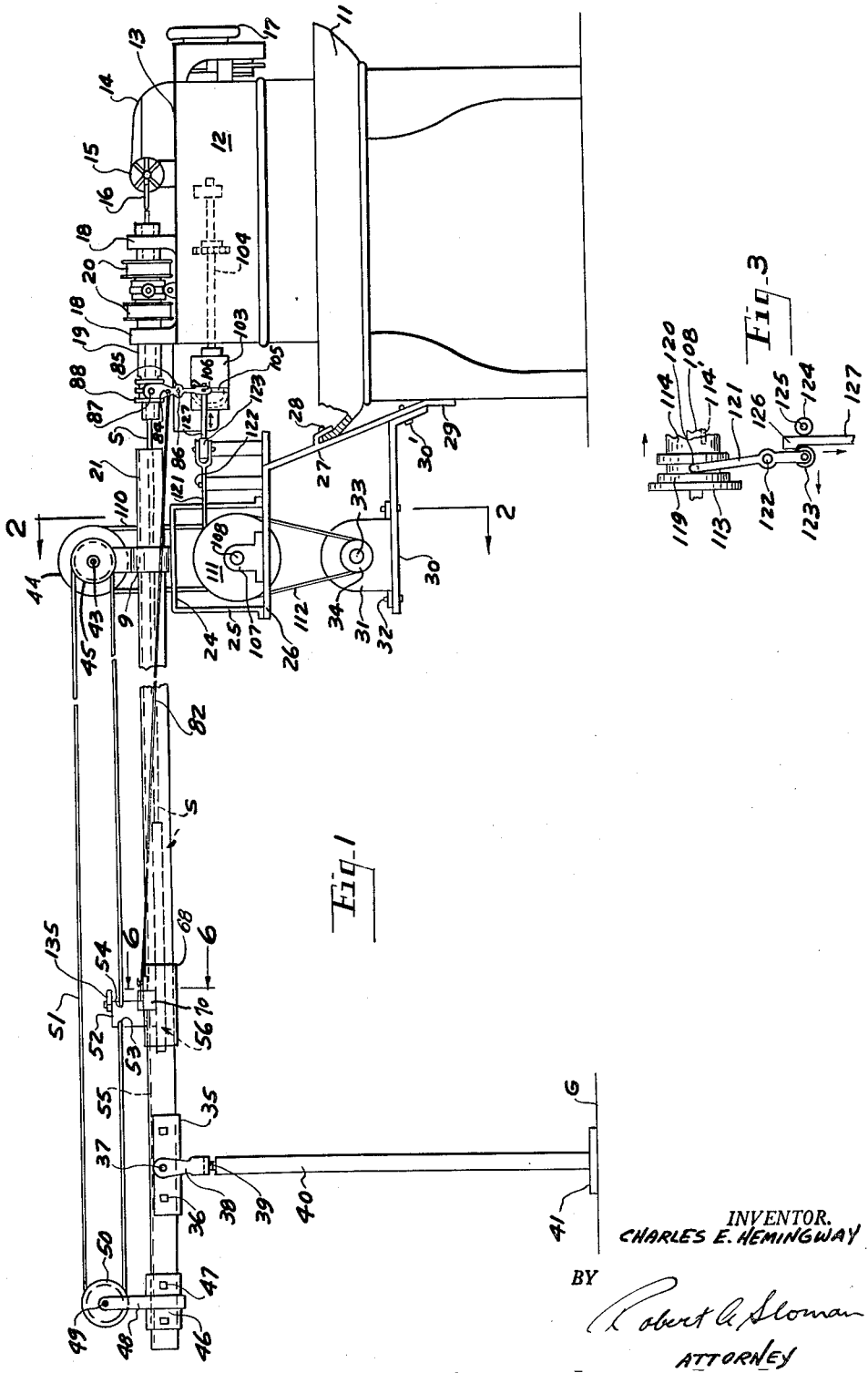
INVENTOR.
CHARLES E. HEMINGWAY
BY Robert A. Sloman
ATTORNEY

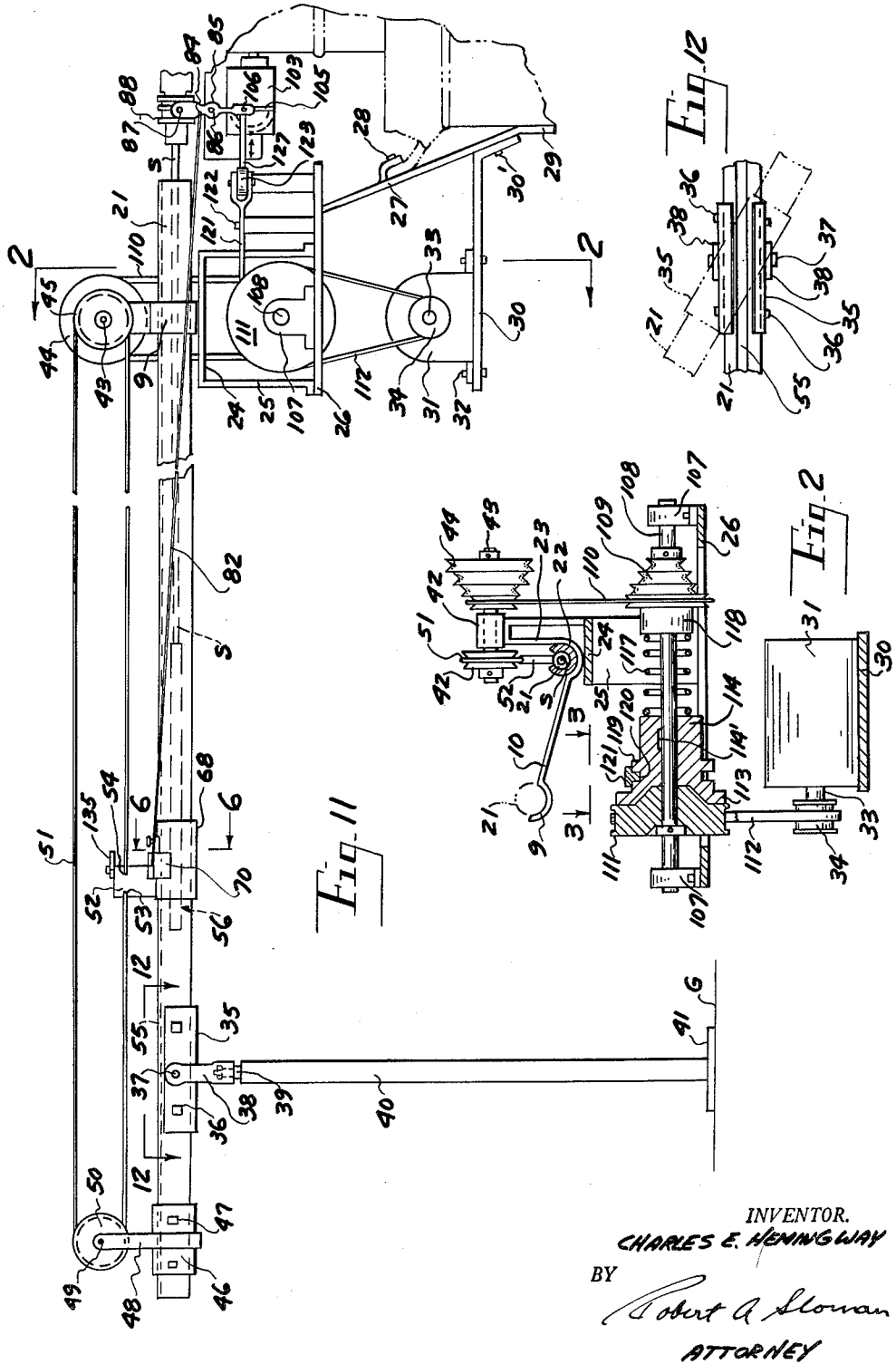

March 27, 1962 C. E. HEMINGWAY 3,027,018
STOCK FEED FOR SCREW MACHINE
Filed May 8, 1957 4 Sheets-Sheet 3
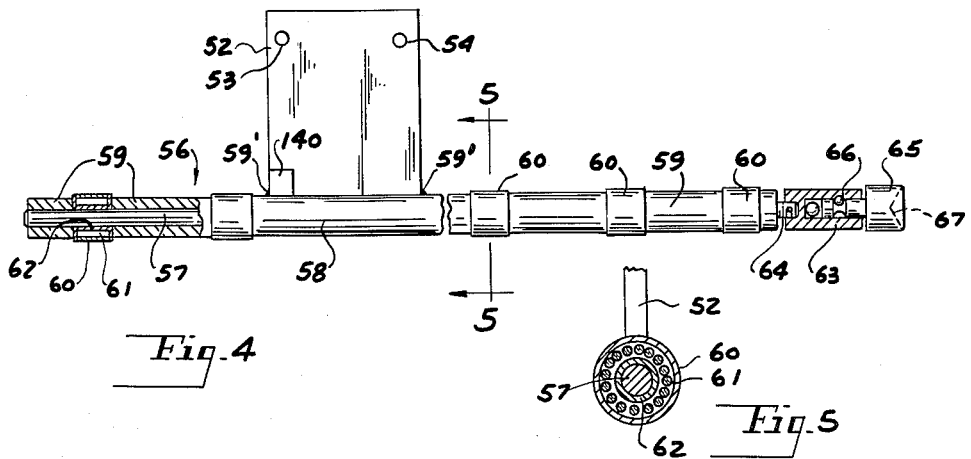
Fig. 4
Fig. 5
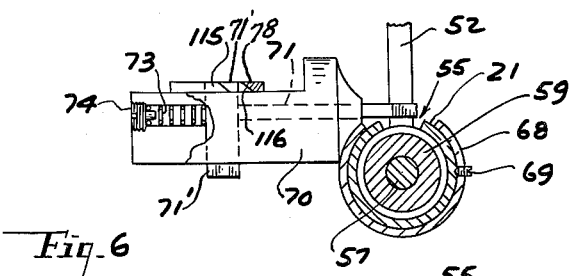
Fig. 6
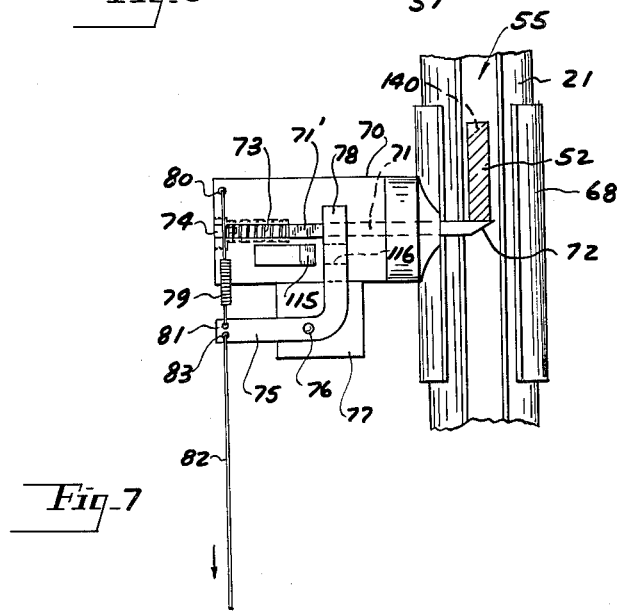
Fig. 7
INVENTOR.
CHARLES E. HEMINGWAY
BY
Robert A. Sloman
ATTORNEY March 27, 1962 C. E. HEMINGWAY 3,027,018
STOCK FEED FOR SCREW MACHINE
Filed May 8, 1957 4 Sheets-Sheet 4
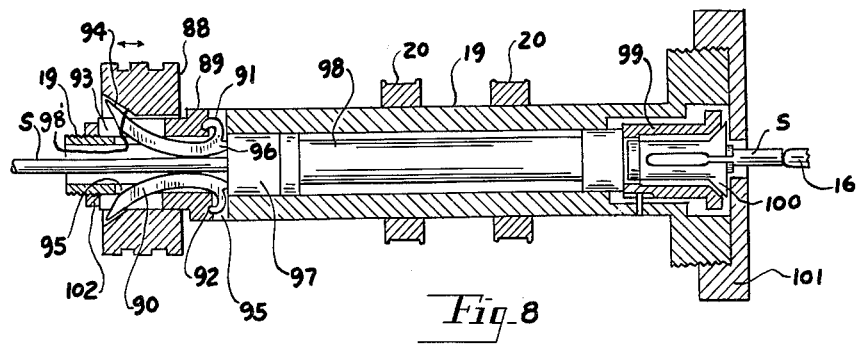
INVENTOR.
CHARLES E. HEMINGWAY
BY
ATTORNEY United States Patent Office 3,027,018
Patented Mar. 27, 1962

3,027,018
STOCK FEED FOR SCREW MACHINE
Charles E. Hemingway, Wyandotte, Mich.
(30446 Prescott, Romulus, Mich.)
Filed May 8, 1957, Ser. No. 658,478
2 Claims. (Cl. 214—1.5)

This invention relates to screw machines and more particularly to a novel stock feed device therefor.

Heretofore various means have been employed for effecting intermittent feeds of the stock through a conventional stock reel forming a part of the machine. Most of these operate too slow. The stock is fed to and through a conventional chuck mechanism which is adapted to open and close automatically after a limited and predetermined in-feed.

This means that under some conditions and for some feed distances there may be required as many as three or more increments of infeeding each of which takes ⅓ of a second, for illustration. In high production jobs where many thousands of units are processed, this would be too slow.

It is a primary object of the present invention to provide means for longitudinally and positively feeding the stock through the stock reel until it reaches a positive stop, forming a part of the machine. This continuous feeding, within limits, will take approximately ⅓ of a second regardless of whether the feed is ⅓ of an inch or from 6 to 8 inches.

It is an object of this invention to provide a continuous conveyor type of feed device for the stock operating in a continuous movement until the stock reaches the positive predetermined stop.

It is a further object of the invention to incorporate mechanism for power driving said conveyor mechanism together with means for rendering the conveyor feed inoperative during the period that the stock is gripped by the conventional chuck and collet.

It is a further object of the present invention to provide in conjunction with a continuously operated power means, a conveyor drive mechanism controlled by the cam operated collet closing chuck fork for automatically disengaging said power means from said drive mechanism when the stock is gripped by said collet. This has the advantage of preventing slippage and wear to the conveyor feeding mechanism at a time when it would otherwise be rendered inoperative by such collet, which retains the stock against further feeding. The drive means is automatically re-engaged with the power means at the moment the collet disengages the stock, permitting immediate feeding.

It is a further object of the present invention to provide a conveyor operated flexible cable type of stock feeding mechanism together with means forming a part of the present invention for de-activating such feed at and during the period when the stock is gripped by the machine collet.

These and other objects will be seen from the following specifications and claims in conjunction with the appended drawings in which:

FIG. 1 is a side elevational view of a screw machine incorporating the present invention.

FIG. 2 is a fragmentary elevational section taken on line 2—2 of FIG. 1.

FIG. 3 is a fragmentary plan section on an enlarged scale taken on line 3—3 of FIG. 2.

FIG. 4 is a side elevational view partly broken away and sectioned on an enlarged scale, illustrating the present feed plunger.

FIG. 5 is a section on an enlarged scale taken on line 5—5 of FIG. 4.

FIG. 6 is a section on an enlarged scale taken on line 6—6 of FIG. 1.

FIG. 7 is a fragmentarily plan view thereof.

FIG. 8 is an enlarged side elevational view partly in section illustrating the stock receiving spindle including the chuck fingers and stock gripping chuck and collet.

FIG. 9 is a fragmentary elevational view illustrating the use of a cable in conjunction with the conveyor feed mechanism.

FIG. 10 is a wiring diagram.

FIG. 11 is the same as FIG. 1, on larger scale and screw machine omitted.

FIG. 12 is a fragmentary section taken on line 12—12 of FIG. 11.

It will be understood that the above drawings illustrate a preferred embodiment of the invention and that other embodiments are contemplated within the scope of the claims hereafter set forth.

Referring to FIG. 1, there is shown a conventional type of screw machine to which is applied the present invention. This machine includes a conventional bed 11 on suitable legs, and mounted thereon the upright machine bed plate 12 having conventional horizontally disposed ways 13.

Turret slide 14 is mounted upon said ways and carries the conventional turret 15 which is adapted to index through an arc of 360 degrees and which carries a series of stock operating tools and the stop 16. A suitable hand wheel is shown at 17 by which the turret slide may be adjusted in a conventional manner. Mounted upon machine bed plate 12 are a pair of upright spaced journals 18 which receive the hollow elongated spindle 19 which is a substantially conventional construction and is shown on an enlarged scale in FIG. 8.

Said spindle includes a pair of spaced driving means 20 such as pulleys whereby the spindle may be rotated by a suitable power mechanism forming a conventional part of the screw machine. Accordingly this mechanism is not further described.

There is provided in longitudinal alignment with spindle 19 the horizontally elongated stock reel 21. Its forward end is movably mounted within the U-shaped cradle 22 forming a part of bracket 23, FIG. 2, which extends upwardly from platform 24 and is secured thereto. This platform has supports 25 depending therefrom mounted upon the lower platform 26 whose angularly downturned end portion 27 is secured at 28 and 29 to the screw machine bed.

There is also provided a motor platform 30 which extends horizontally from platform support 27 and is suitably secured thereon as at 30'. A conventional electric motor 31 is anchored at 32 upon platform 30 and has the usual drive shaft 33 and drive pulley 34. Bracket 35 is secured at 36 to the outer end of the stock reel 21, and is pivoted at 37 within stirrup 38 which is adjustably secured at 39 upon upright standard 40 whose base 41 rests upon the ground surface G.

Cradle 22, FIG. 2 includes an upwardly inclined lateral extension 10 terminating in the semi-circular cradle 9. To facilitate the introduction of stock within stock reel 21, the forward end of said reel is swivelled to the dotted line position shown to rest within cradle 9. The stock may then be inserted longitudinally through the forward end of the stock reel. Thereafter the stock reel is returned to the solid line position shown.

Bracket 23, FIG. 2 has mounted upon the top thereof journal 42 through which rotatably extends shaft 43 carrying the differential pulley set 44 secured thereon. Upon the opposite side of journal 42 on shaft 43 there is mounted and secured another pulley 45.

Spaced longitudinally from pulley 45 there is provided a second pulley 50 in substantial horizontal alignment, journaled and supported at 49 upon stirrup 48 which projects upwardly from bracket 46. This bracket is secured at 47 towards the outer ends of stock reel 21, and may be adjustable longitudinally thereon for taking up any slack in the belt 51 which extends around pulleys 45 and 50. Pulleys 45 and 50 and belt 51 may be replaced by sprocket wheels and a chain, if desired.

The lower flight of belt 51 at its free ends is secured at 53 and 54 to the upright arm 52 which is slidably positioned through the horizontally elongated slot 55 formed throughout the top of stock reel 21.

The feed plunger 56, FIG. 1 longitudinally slides within the stock reel and spindle 19 and is shown on an enlarged scale in FIG. 4. Said plunger includes the elongated shaft 57, and mounted thereover a series of elongated bushings 59 and the bushing 58. Arm 52, longitudinally movable throughout the length of slot 55, is joined within stockreel 21 to central bushing 58 by the welds 59'.

A series of roller bearings 60–61–62, are mounted in spaced relation upon shaft 57 intermediate the ends of adjacent bushings. These bearings project beyond the outer surface of said bushings to minimize any frictional engagement with said spindle.

Sleeve 63 is secured at 64 to the forward end of plunger 56 and has rotatably projecting therefrom head 65 keyed therein at 66, and whose forward end is conically recessed at 67 for operative engagement with the stock S.

Positive means are provided for initially retaining the feed plunger drive arm 52 against forward movement at the beginning of the operation and while the stock receiving chuck is open. For this purpose, and referring to FIGS. 6 and 7, there is provided towards the outer end of stock reel 21, the substantially circular elongated bracket 68 secured to the stock reel by set screws 69. Said bracket includes the laterally directed support 70 within which is slidably mounted the stop 71, whose forward tapered end 72, FIG. 7, normally projects immediately forward of arm 52 when at its rearmost position. Stop 71 is normally retained in this position by coiled spring 73 and spring retainer 74 secured within support 70.

As viewed in FIG. 7, the horizontally disposed cantilever 75 is pivoted at 76 upon the extension 77 on support 70. The rearward arm 78 of the cantilever is arranged upon one side of the upright operating bar 71' which forms a part of stop 71, and projects thereabove.

Initial rotary movement of the cantilever in a counterclockwise direction under the thrust of cable 82 joined to said cantilever arm 81 at 83 will produce a lateral movement to the left of stop shaft 71 disengaging its forward end from plunger actuating arm 52, so that the latter on activation of belt 51 will move longitudinally transmitting a longitudinal thrust to feed plunger 56.

The undersurface of arm 78 has a cam 116 which on continued movement of cantilever 75 engages the cam 115 on support 70, in effect lifting the cantilever arm 78 out of engagement with the upright bar 71', disengaging and releasing the same.

This pivotal movement of cantilever 75 is produced by a thrust to the right of cable 82 in FIG. 1. The cable at its opposite end is connected at 84 to the upright fork 85, pivoted at 86 to plate 12. In the manner hereafter described, when the collet 100, FIG. 8 is opened releasing the stock S, the fork 85 will be tilted to the right in a clockwise direction from the position in FIG. 1.

This thrust is transmitted to cantilever 75, FIG. 7, causing a counterclockwise rotation against the action of coiled spring 79, which is joined at one end of the cantilever arm 81 and at its other end is anchored at 80 to support 70.

As shown in FIG. 6, the initial pivotal movement of cantilever arm 78 merely withdraws the stop 71 to disengage the conveyor drive arm 52. Additional movement in the same direction brings cam 116 into operative registry with stationary cam 115 lifting cantilever arm 78 and releasing stop 71 so that it is free to return after the passage of arm 52, to the same relative position shown in FIG. 7, and under the action of spring 73. It is noted, however, that the arm 52 is now free of stop 71. Cam surface 140 on return of arm 52 engages the tapered end 72 of stop 71 camming it out of the way.

Fork 85 includes inwardly directed studs 87 adapted for operative engagement with chuck sleeve 88 slidable adjustable upon chuck lever fulcrum sleeve 89. A pair of opposed chuck levers 90 are positioned within sleeve 89, and their forward ends 91 are fulcrumed at 92 on said sleeve. Their opposite ends extend outwardly through slots 93 in sleeve 89 and terminate in cams 94.

Stock S extends loosely between levers 90. Sleeve 89 is mounted on the reduced end of spindle 19, which is transversely slotted at 95 to receive portions of said levers. Projections 96 on levers 90 operatively engage the chuck shoe 97 within spindle 19.

Movement to the left of chuck sleeve 88 under the control of fork 85 causes the cam surfaces 98' of said sleeve to engage cams 94 on levers 90, moving their ends radially inward. Levers 90, fulcrumed at 91–92, cause a longitudinal movement to the right of chuck shoe 97, FIG. 8.

This effects a corresponding movement of chuck closing tube 98 and the internally tapered collet sleeve 99. This sleeve in turn cams against the externally tapered stock gripping collet 100, effectively gripping the stock S within rotatable spindle 19. There it is retained during machine operations. Spindle 19 has a collet retaining nut 101 threaded upon its outer end retainingly engaging collet 100. Movement to the right of chuck sleeve 88 under control of fork 85 releases levers 90 and in turn through shoe 97, tube 98, sleeve 99 and collet 100 releases the stock. Sleeve 89 is adjustably secured on spindle 19 by nut 102.

Reciprocal adjustments of chuck sleeve 88 are controlled by pivotal fork 85, FIG. 1. Continuously rotatable cam 103 on power operated shaft 104 has a continuous cam groove 105 into which is projected pin 106 on said fork. Thus rotation of cam 103–105 effects reciprocal pivotal movements of chuck operating fork 85. When the fork pivots counterclockwise from its position in FIG. 1, collet 100 closes and grips the stock. When it pivots clockwise from its position in FIG. 1 the collet and stock are released. When fork 85 pivots counterclockwise closing said collet, there will be a corresponding movement to the right, FIG. 1, or downwardly as in FIG. 3 of arm 127 which is joined to fork 85 as at point 106. Cam 126 on arm 127, FIG. 3, is correspondingly moved.

This is for the purpose of disconnecting the power operated drive from the control mechanism which operates conveyor belt 51, as hereafter described in detail.

Platform 26 has secured thereon a pair of spaced journals 107 which receive the ends of driven shaft 108 and which has secured thereto the differential drive pulley 109. This pulley is connected with the drive pulley 44 on conveyor driveshaft 43 by means of belt 110, FIGS. 1 and 2.

Electric motor 31 on platform 30, controlled by suitable switching means from a suitable power source, drives the pulley 34 which is connected with the idle pulley clutch 111 by belt 112.

Clutch 111 is loosely journaled on shaft 108, and in FIG. 2 is shown in frictional engagement with driven clutch plate 113. Clutch plate 113 with shoulder 119 and connected mounting body 114 is co-axially mounted on shaft 108, and is slidably keyed thereon at 114' in drive connection therewith. Coil spring 117 around shaft 108 is interposed in compression between collar 118 on said shaft and the longitudinally adjustable body 114 on the movable friction clutch plate 113.

As shown in FIG. 2, action of spring 117 has caused clutch plate 113 to be engaged in driven relation by drive clutch 111 to thus impart rotary movement to shaft 108.

This movement is transmitted to conveyor belt 51 through the belt 110 and pulleys 44 and 109.

Body 114 has an enlarged shoulder 119 at one end with an annular groove therein which loosely retains the inwardly projecting ends 120 on fork 121. This fork as shown in FIG. 3, which is in the nature of a fragmentary plan view taken on line 3—3 of FIG. 2, is pivoted at 122 upon the platform 26, also shown in FIG. 1, and at its outer end has pivoted thereto roller 123.

Roller 124 is fixedly pivoted at 125 and is spaced normally from roller 123 a distance less than the width of cam 126 in FIG. 3. Accordingly, as cam supporting arm 127 is moved in the direction of the arrow in FIG. 3 which would be to the right in FIG. 1, fork 121 is operatively pivoted in a clockwise direction.

This in turn through fork elements 120 moves the friction driven clutch element 114 slidably to the right on shaft 108, disconnecting driven clutch 113 from the continuously rotating drive clutch 111. This immediately interrupts the rotation of shaft 108 and the feed movement of conveyor belt 51 connected therewith.

This control movement of cam 126 was produced by the counterclockwise rotation of chuck fork 85, FIG. 1, which corresponded to the movement to the left of chuck sleeve 88 and the gripping of collet 100 with the stock S. In other words, the primary object of the invention is achieved because at the moment that the stock is gripped against further longitudinal movement, the power means which includes the drive clutch 111 is temporarily disconnected from the conveyor belt 51 operated through shaft 108.

At the same time it is important to note that the drive means, including motor 31 and the drive clutch 111 is continuously rotatable. The interruption of the drive to belt 51 takes place simultaneously with the closing of collet 100 gripping the stock. Thus the belt is temporarily deactivated, otherwise it would be merely slipping upon its pulley.

Power movement of fork 85 in clockwise direction causes the release of collet 100, and the stock S is now ready for its next incremental feed movement. This movement of fork 85 causes a movement to the left in FIG. 1 and upwardly in FIG. 3 of cam arm 127.

This withdraws the cam 126 from engagement with the roller 123 on fork 121. The compressed spring 117 instantly moves the driven clutch assembly 113–114 to the left for immediate operative engagement with the continuously driven clutch 111. This is an automatic operation. Accordingly, every time the collet 100, FIG. 8 grips the stock for the screw machine operations, the continuously operating power means is temporarily disconnected from the conveyor drive belt 51. Conversely just as soon as collet 100 releases the stock the belt is reactivated immediately and transmits with maximum power the longitudinal feed force through arm 52 to stock feed plunger 56. This means that the power feed is substantially constant and instantaneous in its response. Nevertheless the longitudinal thrust through belt 51 is temporarily disconnected from the power drive whenever the stock gripping collet is closed.

A slight variation of the present invention is shown in FIG. 9 wherein there is provided stock reel 128 for the stock S; and which includes a reversed turned U-shaped base 129 which terminates in the longitudinally extending support tube 130. An elongated transverse slot 131 is formed through the top surface of tube 130 and is adapted to slidably receive drive arm 132.

Secured to said drive arm within tube 130 is an actuator 133 connected to the rear end of elongated cable 134. This cable is positioned loosely within tubes 129–130 and movably extends into stock reel 128. The forward end of cable 134 is secured to the rear end of stock feed plunger 135, which is of a construction similar to that described above in conjunction with FIGS. 1 and 4.

Cable guides 150 are journaled on and project into tube 129.

Spaced upright brackets 136 and 137 are secured to tube 130 and at their upper ends journal at 138 and 139 respectively the pulley wheels 140, 141 for the power driven belt 142 which extends thereover.

The ends of said belt are secured at points 143 and 144 to the drive arm 132. Pulley 141 and its supporting shaft 139 are power operated in the same manner as pulley 45 shown in FIG. 2. Accordingly the detail of this structure is not repeated.

The automatic mechanism above described for deactivating belt 51 is equally applicable to belt 142, FIG. 9.

FIG. 10 diagrammatically illustrates a simple electrical circuit for the motor 31 shown in FIGS. 1 and 2. There is provided suitable leads 145 which connect motor 31 with the power source 146 through the normally closed limit switch 147 and the associated coiled spring 148. Arm 52 carries thereon the switch actuator 149 which in its final position at the end of a predetermined amount of feeding, operatively engages limit switch 147 deenergizing the power means or motor 31.

At this point the feed plunger 56 has been moved longitudinally into spindle 19 and tube 98 so that substantially all of the stock has been gradually and intermittently fed to collet 100. Switch 147, FIG. 10 may include means for reversing the direction of operation of motor 31 so that at the end of the stock feed, the motor 31 automatically reverses causing the feed plunger 56 to move rearwardly in stock reel 21 to its initial position, FIGS. 1 and 7.

While a mechanically operated clutch means is shown and described in the present illustrative embodiment of the invention, many other types of clutch means may be employed, such as an electrically operated clutch, with the operation thereof nevertheless controlled by reciprocal movements of the above described fork 85. For example, said fork could operate a pair of switches in the above described electrical circuit shown in FIG. 10 for controlling the operation of a magnetically operated clutch, in turn controlling connections between the above described power drive and the power driven means.

In the illustrative embodiment of the invention a conveyor type of drive is shown in FIG. 1 for feed plunger 56. It was the reciprocal movement of chuck fork 85, FIG. 1, which controlled the automatic deenergization of the feed whenever the collet closed gripping the stock. Likewise when the collet opened releasing the stock under the control of fork 85, the feed of the plunger 56 was simultaneously activated.

It is contemplated as a part of the present invention that other types of power means or feeds for said plunger may be employed, with the operation thereof intermittently interrupted under the control of power operated pivotal fork 85, FIG. 1. For example, instead of the belt and pulley arrangement in FIG. 9, there would be substituted a hydraulic or pneumatic cylinder for feeding control arm 132. Such cylinder would be suitably connected with a source of pressure fluid, with the supply of pressure fluid intermittently controlled by the alterations of the above described cam operated fork 85.

Having described my invention, reference should now be had to the following claims:

1. In a stock feed for a screw machine, a horizontally disposed tubular stock reel loosely supporting an elongated stock, there being an elongated slot extending through the wall of said reel, a feed plunger in said reel axially engaging the rear end of the stock, a drive arm on said plunger loosely extending through the slot in said reel and adapted for longitudinal movement therein, a support, a control fork pivotally mounted on said support, a support on said reel towards its outer end, a spring biased stop slidably mounted on said latter support movable transversely of the path of movement of said drive arm and normally lying in its path, an operating bar projecting above said stop, a spring biased cantilever pivotally mounted on said latter support with one arm loosely bearing against said operating bar, and a linkage between the other arm of said cantilever and said control fork whereby initial movement of said fork effects a corresponding movement of said linkage rotating said cantilever and effecting a transverse movement of said operating bar to withdraw said stop and release said drive arm.

2. In a stock feed for a screw machine, a horizontally disposed tubular stock reel loosely supporting an elongated stock, there being an elongated slot extending through the wall of said reel, a feed plunger in said reel axially engaging the rear end of the stock, a drive arm on said plunger loosely extending through the slot in said reel and adapted for longitudinal movement therein, a support, a control fork pivotally mounted on said support intermediate its ends on said reel towards its outer end, a spring biased stop slidably mounted on said latter support movable transversely of the path of movement of said drive arm and normally lying in its path, an operating bar projecting above said stop, a spring biased cantilever pivotally mounted on said latter support with one arm loosely bearing against said operating bar, a linkage between the other arm of said cantilever and said control fork, whereby initial longitudinal movement of said control fork effects a corresponding movement of said linkage rotating said cantilever and effecting a transverse movement of said operating bar to withdraw said stop and release said drive arm, a cam on said latter support, and a second cam on the undersurface of said cantilever spaced from said first cam, whereby further pivotal movement of the cantilever brings said cams together lifting said cantilever out of the path of return movement of said operating bar.

References Cited in the file of this patent

UNITED STATES PATENTS

| | | |
|---|---|---|
| 1,657,098 | Van Hamersveld | Jan. 24, 1908 |
| 1,956,999 | Rupple | May 1, 1934 |
| 2,108,274 | Tautz | Feb. 15, 1938 |
| 2,339,712 | Mariotte | Jan. 18, 1944 |
| 2,451,367 | Twamley | Oct. 12, 1948 |
| 2,573,152 | Leifer | Oct. 30, 1951 |
| 2,602,212 | Rosenberg | July 8, 1952 |
| 2,623,267 | Retz | Dec. 30, 1952 |
| 2,626,452 | Gridley | Jan. 27, 1953 |

FOREIGN PATENTS

| | | |
|---|---|---|
| 171,745 | Great Britain | Nov. 11, 1921 |